US010965651B2

(12) United States Patent
Kapoor et al.

(10) Patent No.: US 10,965,651 B2
(45) Date of Patent: Mar. 30, 2021

(54) SECURE DOMAIN NAME SYSTEM TO SUPPORT A PRIVATE COMMUNICATION SERVICE

(71) Applicant: ColorTokens, Inc., Santa Clara, CA (US)

(72) Inventors: Anoop Kapoor, San Jose, CA (US); Ryan Farjadi, Cupertino, CA (US); Pankaj Parekh, Fremont, CA (US); Ashish Trivedi, Fremont, CA (US); Satyam Tyagi, Mountain View, CA (US); Harish Magganmane, San Jose, CA (US); Deepak Mohanty, Fremont, CA (US); Ravi Voleti, Fremont, CA (US)

(73) Assignee: COLORTOKENS, INC., Santa Clara, CA (US)

(*) Notice: Subject to any disclaimer, the term of this patent is extended or adjusted under 35 U.S.C. 154(b) by 491 days.

(21) Appl. No.: 15/848,983

(22) Filed: Dec. 20, 2017

(65) Prior Publication Data

US 2019/0190894 A1 Jun. 20, 2019

(51) Int. Cl.
*H04L 9/32* (2006.01)
*H04L 29/06* (2006.01)
*H04L 29/12* (2006.01)
*H04L 29/08* (2006.01)

(52) U.S. Cl.
CPC ...... *H04L 63/0428* (2013.01); *H04L 61/1511* (2013.01); *H04L 61/2007* (2013.01); *H04L 61/2514* (2013.01); *H04L 67/02* (2013.01); *H04L 61/308* (2013.01)

(58) Field of Classification Search
CPC ............. H04L 63/0428; H04L 61/2514; H04L 61/2007; H04L 61/1511; H04L 61/308
See application file for complete search history.

(56) References Cited

U.S. PATENT DOCUMENTS

| 2003/0154306 | A1* | 8/2003 | Perry | ............... H04L 29/12009 709/245 |
| 2014/0006577 | A1* | 1/2014 | Joe | ..................... H04L 61/1511 709/223 |
| 2017/0187733 | A1* | 6/2017 | Ahn | .................... H04L 61/1511 |

* cited by examiner

*Primary Examiner* — Fatoumata Traore
*Assistant Examiner* — Carlton Johnson
(74) *Attorney, Agent, or Firm* — Barry Choobin; Patent 360LLC

(57) ABSTRACT

Described herein are systems, methods, and software to enhance secure communications between computing systems. In one implementation, a private domain name system (DNS) receives a DNS lookup request from a computing system of a plurality of computing systems associated with a private communication group, and forwards the DNS lookup request to a public DNS. The private DNS further receives a public address associated with the DNS lookup request from the public DNS, translates the public address to a private address, and transfers the private address to the requesting computing system.

19 Claims, 7 Drawing Sheets

| PUBLIC ADDRESSING INFO 510 | PRIVATE ADDRESSING INFO 520 |
|---|---|
| PUBLIC ADDRESS 540 | PRIVATE ADDRESS 550 |
| PUBLIC ADDRESS 541 | PRIVATE ADDRESS 551 |
| PUBLIC ADDRESS 542 | PRIVATE ADDRESS 552 |
| PUBLIC ADDRESS 543 | PRIVATE ADDRESS 553 |

450

SECURE DOMAIN NAME SYSTEM TO SUPPORT A PRIVATE COMMUNICATION SERVICE

BACKGROUND

In computing networks, computing systems, both real and virtual, often include applications and services that require communications with other computing systems to provide desired operations. For example, an application on a first computing system may require data from a database located on a second computing system. Consequently, to provide the communication, the data payload may be placed in a network packet, and transferred to the required computing system. However, although network packets provide a method of communication between computing systems, difficulties often arise in managing security between the computing systems.

To overcome some of the deficiencies presented in securing network communications between computing systems, various technologies have been developed. These technologies include virtual local area networks (VLANs), encryption for the data payload within the data packets, amongst other similar security procedures. Yet, while current security technologies may provide additional security over unprotected network packets, managing the deployment of the security configurations can often be difficult and cumbersome. Further, providing a cohesive inter-computing system security policy may be difficult without modifying the applications on the computing systems, and/or the configurations provided by switches and routers providing the connectivity to the computing systems. This problem is compounded when applications on the computing systems require domain name systems (DNSs) to provide their required operations.

OVERVIEW

The technology disclosed herein enhances the security of domain name system (DNS) interactions in a computing environment. In one implementation, a method of operating a private DNS for a computing network includes receiving a DNS lookup request from a computing system of a plurality of computing systems in the computing network and forwarding the DNS lookup request to a public DNS. The method further includes receiving a public address associated with the DNS lookup request from the public DNS, translating the public address to a private address, and transferring the private address to the computing system.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

Figure 1:
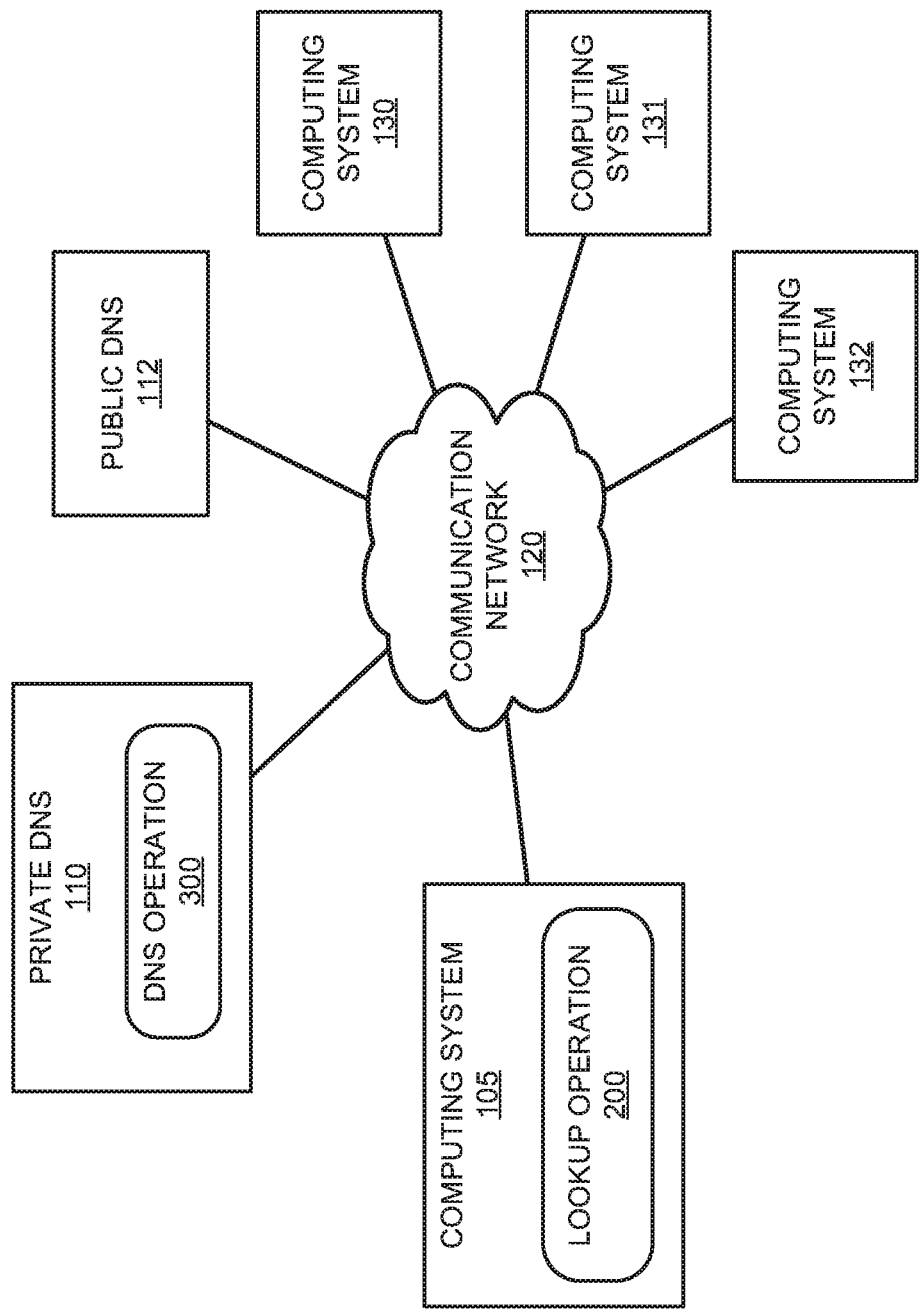
FIG. 1 illustrates a computing network to provide secure network communications according to an implementation.

The various examples disclosed herein provide enhancements for managing data communications between computing systems. In particular, computing systems, both real and virtual, include various applications that often require communication with other computing systems to provide desired operations. For example, in an organization's computing network, a service application on a first computing system may require communications with a database on a second computing system. To provide this communication, a network packet may be generated at the first computing system in response to a communication request from the application and the packet may be transferred to the second computing system, wherein the network packet may include a header portion with addressing and protocol information and a payload portion that includes the data for the application.

Here, to improve the security of communications between computing systems, a computing system that is required to communicate with one or more other computing systems may be configured with a communication service that can identify and manage communications with the other computing systems. In a particular example, as a communication request is generated from an application on a computing system, rather than forwarding the communication to the Transmission Control Protocol/Internet Protocol (TCP/IP) portion of the operating system or other software element of the computing system, the packet may be forwarded to a communication service. This communication service, which may operate as part of or alongside the operating system, may determine whether the communication is permitted, and if permitted, configure a network packet for delivery to a second computing system with the data payload for the application and at least private addressing information to secure the communication.

In at least one example, the private addressing information may include at least a source private address for the application and, in some implementations, a destination private address for the destination application, a source port, a destination port, or some other similar private addressing information. In including the private addressing information, applications on the computing system may be provided with their own private or overlay network addressing, permitting the application to communicate with other applications (on supporting computing systems) that share the overlay network. An overlay network is a private network that is built on top of another network (sometimes referred to as an underlay network).

Once the application is allocated to an overlay network, the application may address other applications in the private network using the private addressing information associated with the overlay network, wherein the communications are identified at a virtual network interface provided by the communication service. Once the request is received, the service may identify destination information (overlay network destination information) for the requested communication, and determine whether the communication is permitted. Once permitted, the service may identify public addressing information for addressing the destination computing system on the underlay network, and generate a packet that can be transferred to the second computing system. This packet may include an encrypted portion for the application data with the private addressing information (overlay addressing information), and include a non-encrypted portion with the public addressing information (underlay addressing information) and group identifier information for the requesting application.

The group identifier information is used by the destination computing system in determining how to process a received packet. In particular, the group identifier information may include a revision associated with the communication service, a group corresponding to the requesting application (i.e. an identifier that permits defined applications to communicate), and other relevant information to decrypt the payload of the packet. This information for decrypting the packet may include information about the length of the encrypted data payload, information about the sequence number of the packet, a keyed-hash message authentication code (HMAC), a peer identifier (peerID), an initialization vector (IV) or seed, or some other similar information, including combinations thereof. Based on the group identifier information, the receiving computing system may determine whether the packet is permitted (e.g. whether the packet can be decrypted and supplied to an associated application), or whether the communication should be blocked from being provided to the associated application.

In the present implementation, applications executing on the computing systems may require domain name system (DNS) lookup requests to identify an internet protocol (IP) address associated with a desired destination. For example, an application on a computing system may provide a Uniform Resource Locator (URL), a Uniform Resource Indicator (URI), or some other similar addressing. In response to the application providing the addressing, the communication service executing on the computing system may be used to translate the addressing into an IP address required for the communication. To provide this operation, the communication service may provide the URI, URL, or other similar addressing as a DNS lookup request to a private DNS (wherein the private DNS comprises a server or provider computing system) associated with the communication service. Once provided to the private DNS, the private DNS may forward the DNS lookup request to a public DNS (wherein the public DNS comprises a server or provider computing system accessible by computing systems part of and outside the private network) to identify a public address associated with the request. After identifying the public address, the public address may be transferred to the private DNS, wherein the private DNS translates the public address into a private address. For example, a first public IP address (outside of the overlay network) may be identified to support the DNS lookup request, however, to support communications on the requesting computing system, a private address may be required for overlay network communications provided by the communication service. As a result, rather than providing the first public IP address, the private DNS may translate the first public IP address to a second private IP address that is associated with the overlay network for the computing system, and provide the private IP address to the computing system for addressing the requested application and computing system.

FIG. 1 illustrates a computing network 100 to provide secure network communications according to an implementation. Computing network 100 includes computing system 105, computing systems 130-132, private DNS 110, and public DNS 112. Computing system 105, computing systems 130-132, private DNS 110, and public DNS 112 communicate via communication network 120. Computing system 105 provides lookup operation 200 further described in FIG. 2, and private DNS 110 provides DNS operation 300 further described in FIG. 3. Although illustrated in the present example using four computing systems, it should be understood that any number of computing systems may be part of the private network that uses private DNS 110.

In operation, computing system 105 and computing systems 130-132 execute a communication service that provides overlay or private networking operations for applications executing on the computing systems. In particular, when a communication is required between applications on the computing systems, such as a communication between computing system 105 and computing system 130, the communication service may identify a communication request and generate one or more network packets to support the request. Each network packet will include an encrypted portion containing the data for the application and private addressing information associated with an overlay network for the computing systems, and a non-encrypted portion that includes public addressing information and supplementary information (group identifier information) to decrypt the packet. In some implementations, the private addressing information may include source/destination IP addresses and source/destination ports, and the public addressing information may include different source/destination IP addresses, and different source/destination ports.

In some implementations, applications on the computing systems may use URIs and URLs in requesting communications with other computing systems. For example, in addressing computing system 130, computing system 105 may provide an address, such as "www.xyz.com." To identify the addressing to generate the secure packets described above, the communication service on computing system 105 may contact private DNS 110 to identify the appropriate destination address. Private DNS 110 comprises a DNS that is only accessible to computing systems that share an overlay network, and is not accessible to other "public" computing systems that are not part of the overlay network. Once provided to private DNS 110, private DNS 110 may work with public DNS 112 to identify the appropriate private destination address and provide the private destination address to computing system 105. After receiving the private destination address, the communications service may generate a secure packet as described herein.

Figure 2:
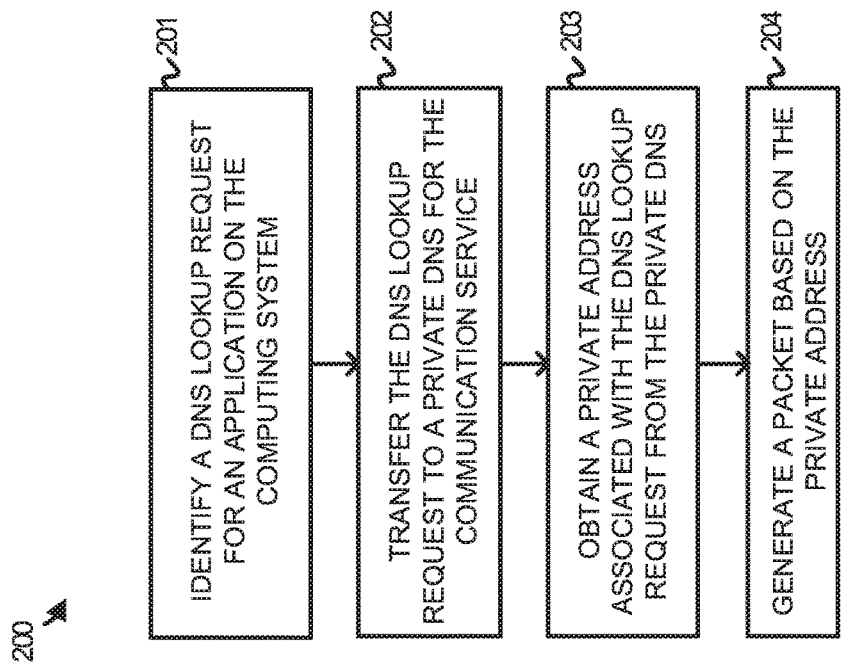
FIG. 2 illustrates a lookup operation of a computing system to provide a secure domain name system (DNS) interaction according to an implementation.

FIG. 2 illustrates a lookup operation 200 of a computing system to provide a secure DNS interaction according to an implementation. The processes of lookup operation 200 are referenced parenthetically in the paragraphs that follow with reference to systems and elements of computing network 100. Lookup operation 200 may execute as part of a communication service that operates as part of an operating system or alongside an operating system of computing system 105 to provide secure communications for applications of computing system 105.

As depicted in FIG. 2, lookup operation 200 includes identifying (201) a DNS lookup request for an application on the computing system. For example, a web browsing application executing on computing system 105 may generate a request to retrieve data from a particular URL. In response to the request, lookup operation 200 transfers (202) the DNS lookup request to a private DNS associated with the communication service. In some implementations, when the communication service is configured on the computing system, the communication service may be provided with permissions for addressing other computing systems. In particular, these permissions may include private addressing information for the overlay portion of communications, and public addressing for the underlay portion of communications. This permission information is used in defining which computing systems and associated applications thereon may be accessed by a particular computing system. The permission information may further define a private DNS that should be used by the computing system in communicating with other computing systems that are part of the private network.

Here, once the DNS lookup request is provided to private DNS 110, computing system 105 then obtains (203) or receives a private address associated with the DNS lookup request from private DNS 110. This private address defines a private destination address for the requested computing system, which may be used in generating the packet to be delivered to the destination computing system. In particular, once the private address is obtained, lookup operation 200 generates (204) at least one packet based on the private address from the private DNS. This packet may include an encrypted portion and an unencrypted portion, wherein the encrypted portion includes the data for the application and private addressing (provided at least partially from the private DNS and used with the overlay network for the application), and wherein the unencrypted portion may include public addressing information (used in providing the underlay network communication between the computing systems).

As an illustrative example, an application executing on computing system 105 may attempt to retrieve data from an application on computing system 130. In response to the request, lookup operation may retrieve a private destination address associated with computing system 130, and generate at least one secure packet to communicate with computing system 130. Each of the secure packets may include an encrypted portion and a non-encrypted portion, wherein the encrypted portion may include data from the application and private addressing information to address the appropriate application on computing system 130, and the non-encrypted portion may include public addressing information for addressing computing system 130 and supplemental decryption information. This supplemental decryption information may be used by computing system 130 to decrypt the payload of the packet.

In some implementations, in providing the packet from computing system 105 to private DNS 110, lookup operation 200 may use secure packets in providing the DNS lookup request. In particular, private DNS 110 may be allocated its own communication service (similar to that of computing system 105) that serves to provide secure packet communications with computing systems within the private network. For example, when a DNS request is required at computing system 105, the communication service at computing system 105 may generate a secure packet with an encrypted portion and a non-encrypted portion, wherein the encrypted portion may include the URL or URI associated with the DNS lookup request and the non-encrypted portion may include public addressing information for private DNS 110 (or the computing system associated therewith) along with information to decrypt the encrypted portion of the packet. As a result, any computing system without the proper information within the packet may have the packet rejected prior to being processed by private DNS 110. In some implementations, the communication service for private DNS 110 may further generate its own secure packets as described herein to return the private addressing information to requesting computing systems.

Figure 3:
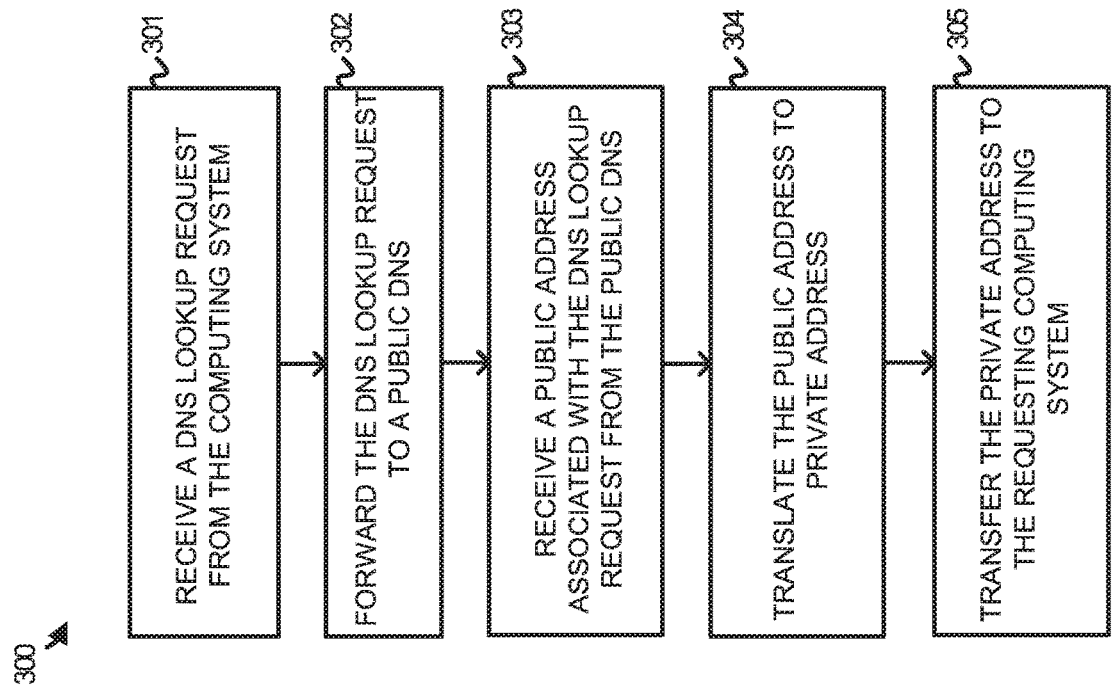
FIG. 3 illustrates a DNS operation of a private DNS to provide a secure interaction with a computing system according to an implementation.

FIG. 3 illustrates a DNS operation 300 of a private DNS to provide a secure interaction with a computing system according to an implementation. DNS operation 300 is described parenthetically in the paragraphs that follow with reference to systems and elements of computing network 100 of FIG. 1.

As depicted, DNS operation 300 includes receiving (301) a DNS lookup request from a computing system. This lookup request includes a URI or URL associated with a destination service or computing system required by the requesting computing system. In some implementations, the DNS lookup request may be provided to private DNS 110 as part of a secure packet. In supporting the secure packet, private DNS 110 may operate as part of a private communication group, wherein computing systems that belong to the communication group may request and receive addressing information from the private DNS. In generating the request, the computing system, such as computing system 105, may generate at least one packet for the DNS request, wherein each of the packets includes an encrypted portion and a non-encrypted portion. The encrypted portion will include data for the request (e.g. the URL) and private addressing information associated with the overlay network or private communication group (e.g. private source addressing for the application requiring the DNS lookup request on computing system 105, private destination addressing for the private DNS service or computing system operating thereon, or some other similar information). The non-encrypted portion of the request may include public addressing associated with the underlay network addressing for computing system 105 and the computing system providing private DNS 110, and may further include supplementary decryption information to decrypt the encrypted portion of the packet. This supplementary information may include a group identifier (a string of bits identifying the communication group for the requesting computing system), information about the length of the encrypted data payload, information about the sequence number of the packet, a keyed-hash message authentication code (HMAC), a peer identifier (peerID), an initialization vector (IV) or seed, or some other similar information, including combinations thereof. Once the secure packet is received at private DNS 110, the communications service may be used to decrypt the packet using the information in the packet and encryptions keys or certificates maintained by the private DNS to identify the DNS lookup request therein.

Once the request is identified, operation 300 further forwards (302) the DNS lookup request to a public DNS 112 with addressing information to support the request. After forwarding the request, operation 300 then receives (303) a public address associated with the DNS lookup request from the public DNS. In some implementations, the public address may comprise an IP address from which computing systems that are not part of the communication group may communicate with the desired destination application or service.

Once the public address is received, operation 300 translates (304) the public address to a private address associated with the private network for the requesting computing system. In particular, rather than accessing a service using the public IP address associated with the service, the requesting computing system may instead access a particular service using a private IP address associated with an overlay network for computing systems associated with the private communication group. After translating the IP address, operation 300 transfers (305) the private address to the requesting computing system, wherein the requesting computing system may use the private IP address to contact the required destination computing system. In some implementations, this private address may be encapsulated in a secure packet as further described herein, wherein the secure packet may include an encrypted portion and a non-encrypted portion. The encrypted portion includes the identified private destination address, as well as private addressing permitting the private DNS to address the computing system on the overlay network, and the non-encrypted portion may include public addressing to address the computing system on the underlay network, as well as information to decrypt the packet.

In at least some implementations, when the private IP address is transferred to computing system 105, the communication service on computing system 105 may receive the packet, and use the obtained private address to generate required packets for the application. For example, if computing system 105 were to communicate with an application on computing system 130, then one or more packets may be generated for the communication using the private destination address for computing system 130 obtained from private DNS 110.

In some examples, the translation process in DNS operation 300 may be conditional. In particular, when the public address is obtained from the public DNS, private DNS 110 may determine whether a private address is available for the underlay network. If a private address is available, then the private address is provided to the requesting computing system. In contrast, if a private address is not available to support the communication, private DNS may either return the public network address associated with the requested service, or may prevent the public address from being provided as the service is not on the private overlay network. The determination of whether to provide the public address or block the request may be made via a policy defined by an administrator of the private overlay network.

Figure 4:
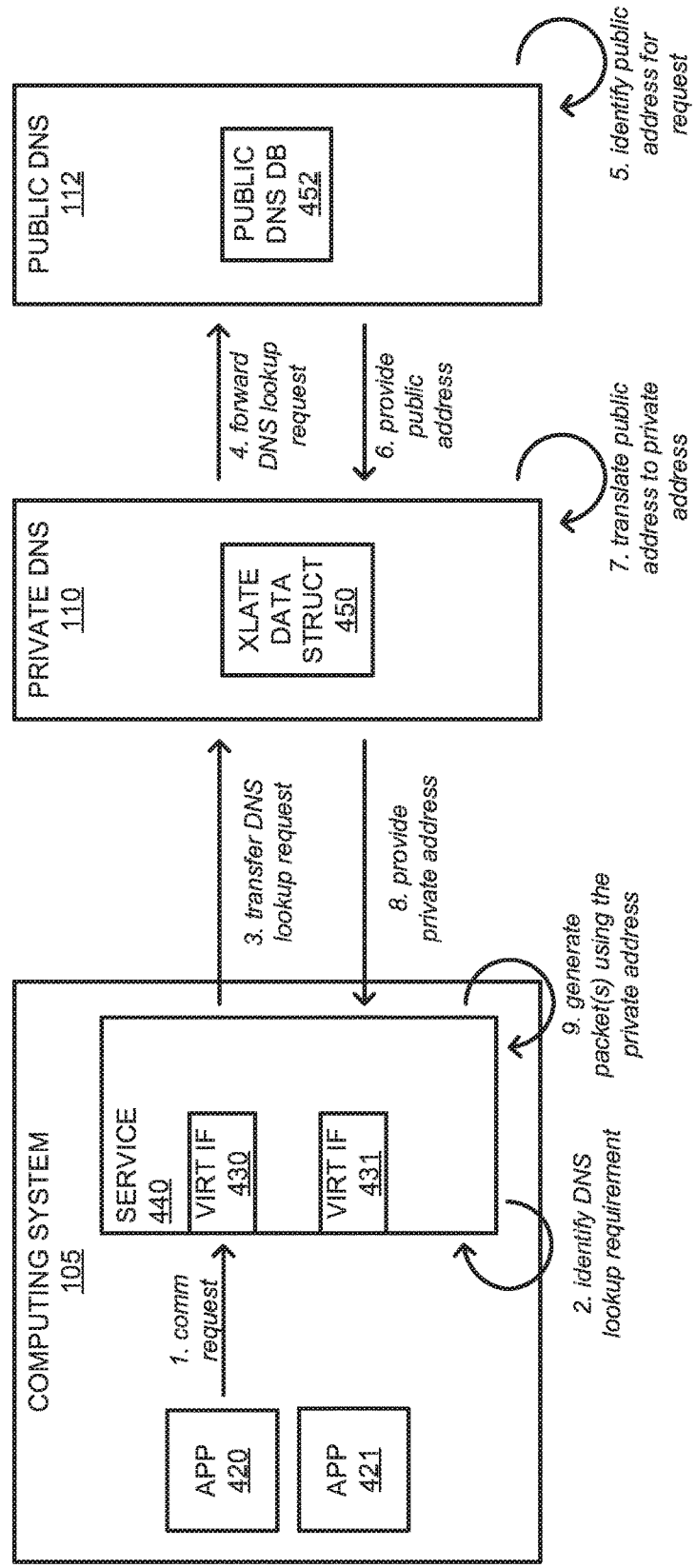
FIG. 4 illustrates an operational scenario of a secure DNS interaction according to an implementation.

FIG. 4 illustrates an operational scenario 400 of a secure DNS interaction according to an implementation. Operational scenario 400 includes computing system 105, private DNS 110, and public DNS 112. Computing system 105 further includes communication service 440 that provides virtual interfaces 430-431 to corresponding applications 420-421. Private DNS 110 further includes translate data structure (struct) 450, and public DNS database (DB) 452. Although not illustrated in the present example, it should be understood that private DNS 110 may include or be allocated a communication service similar to service 440.

In operation, applications 420-421 may require various communications with other computing systems to provide their desired operation. For example, a web browsing application may require interactions with one or more servers to obtain and transfer required data for a user of computing system 105. In the present implementation, application 420 generates a communication request at step 1, wherein the communication is identified at virtual interface 430 provided by service 440. This service, which operates alongside or as part of the operating system, is used to provide overlay network security for the applications executing on the computing system, and may further be used to provide required DNS interaction functionality. In the present example, the communication request from application 420 is identified as requiring a DNS lookup request, at step 2. For example, application 420 may require data from a particular URL. In response to the request, service 440 transfers, at step 3, a DNS lookup request to private DNS 110, wherein the request includes at least the URL or URI associated with the request.

In some implementations, in transferring the DNS lookup request to the private DNS, service 440 may be responsible for generating a secure packet. This secure packet may include an encrypted portion with at least the DNS lookup request (e.g. the URL, URI, and the like) and private addressing associated with the overlay network for computing system 105 (and/or application 420 on computing system 105) and private DNS 110. The packet may further include public addressing information that is used to route communications on the underlay network between the computing system and the private DNS. In particular, if private DNS 110 operated as an application on a computing system, a communication service similar to that on computing system 105 may be addressable using a public network address (or an underlay network address) associated with the computing system. Once the secure packet is received, private DNS 110 may then identify the DNS lookup request therein.

After the DNS lookup request is received by private DNS 110, private DNS 110 forwards the DNS lookup request to public DNS 112, wherein the public DNS is accessible to computing systems outside of the private communication group. In response to receiving the DNS lookup request, public DNS 112 consults public DNS database 452 to identify, at step 5, a public address for the request. For example, if computing system 105 requested an address associated with "www.XYZ.com," then public DNS 112 may provide an IP address associated with the particular URL. Once the public network address is identified for the DNS lookup request, the public address is provided, at step 6, to private DNS 110, wherein private DNS will translate the public address to a private address using translate data structure, at step 7.

As described herein, computing systems and their corresponding applications may belong to a private overlay network, wherein the applications may communicate with applications on other computing systems that are in the same overlay network. However, instead of addressing the applications using the public IP address, computing systems that reside in the private communication group use private addressing information to communicate with one another. Thus, when a public IP address is provided from public DNS 112, private DNS 110 may translate the request into a second private IP address capable of being used by computing system 105 in communicating with the desired destination computing system. Once the private address is identified, the private address is provided, at step 8, to service 440 on computing system 105, wherein the private address may be used in generating packets at step 9 on computing system 105. In transferring the private IP address to computing system 105, a communication service for private DNS 110 may generate a secure packet as described herein.

In some implementations, in generating the packets for application 420, service 440 may use the private address provided by private DNS 110 to determine additional information for destination computing system. Referring to an example of FIG. 1, if computing system 105 were communicating with computing system 130, the private destination address for computing system 130 may be used by service 440 on computing system 105 to identify a public IP address associated with the computing system, a public port associated with the computing system, or any other similar addressing information for communicating with computing system 130. Once the additional addressing is determined, secure packets may be generated to be provided to computing system 130. These secure packets include a non-encrypted portion comprising the public addressing information corresponding to the underlay network between the computing systems (e.g. source/destination public addresses, source/destination public ports, and the like), and a supplemental information that can be used in decrypting an encrypted portion of the packet. This encrypted portion of the packet will include any data or commands for application 420, and will also include the private addressing information (e.g. source/destination private addresses, source/destination private ports, and the like). In some examples, the supplemental information may include a group identifier (associated with the communication group for computing systems 105 and computing systems 130-132), a communications service version number, as well as other encryption parameters for decrypting the encrypted portion of the packet.

Figure 5:
FIG. 5 illustrates a translate data structure for managing secure addressing information and private addressing information according to an implementation.

In some examples, the translation of the public IP address to the private IP address at private DNS 110 is conditional. In providing this operation, when a public address is obtained from public DNS 112, private DNS 110 may determine whether a private address is available that corresponds to the public address. If a private address is available, then the private address is provided to the requesting computing system. However, if a private address is not available, private DNS 110 may provide the public address or may prevent the transfer of the public address as the destination service or application is not in the private overlay network, FIG. 5 illustrates a translate data structure 450 for managing secure addressing information and private addressing information according to an implementation. Data structure 450 is an example data structure to be used by private DNS 110, although other examples may exist. Although demonstrated as a table in the present implementation, it should be understood that other types of data structures may be used in identifying private network addresses that correspond to public network addresses. In the present implementation, translate data structure 450 includes columns for public addressing information 510 with corresponding entries for public addresses 540-543, and private addressing information 520 with corresponding entries for private addresses 550-553. Although demonstrated in the example of FIG. 5 with four entries, it should be understood that a larger or fewer number of entries may be employed depending on the size of the private network.

As described previously in FIG. 4, when computing systems in a private communication group require communications with other computing systems, the computing systems may inquire a private DNS to determine addressing for the desired computing system. When a URL or URI within the DNS lookup request requires a determination of the public address, the private DNS may forward the lookup request to the appropriate public DNS. In response to the request, the public DNS may supply a public address for the particular destination to the private DNS. Once the public address is obtained, data structure 450 may be used to translate the public address to the appropriate private address associated with the overlay network and the private communication group.

Using an example from FIG. 1, if computing system 105 requested a communication with a particular URL, the public addressing corresponding to the URL may be provided from the public DNS. In response to receiving the public addressing, data structure 450 may be used to associate the address (IP address) with the required private address. Thus, if public address 541 were obtained from the public DNS, then private address 551 may be identified and provided to requesting computing system 105.

In some implementations, private DNS 110 may supply private addressing information for a particular communication group, and other private DNSs may provide private addressing for additional communication groups. Accordingly, based on the configuration of the communication services executing on the computing systems will determine which DNS is contacted to resolve a DNS lookup request. For example, while computing system 105 and computing systems 130-132 may communicate as a first communication group and use private DNS 110, it should be understood that other computing systems that use a communication service, such as those described herein, may belong to alternative communication groups and rely on different DNSs to resolve DNS lookup queries.

Figure 6:
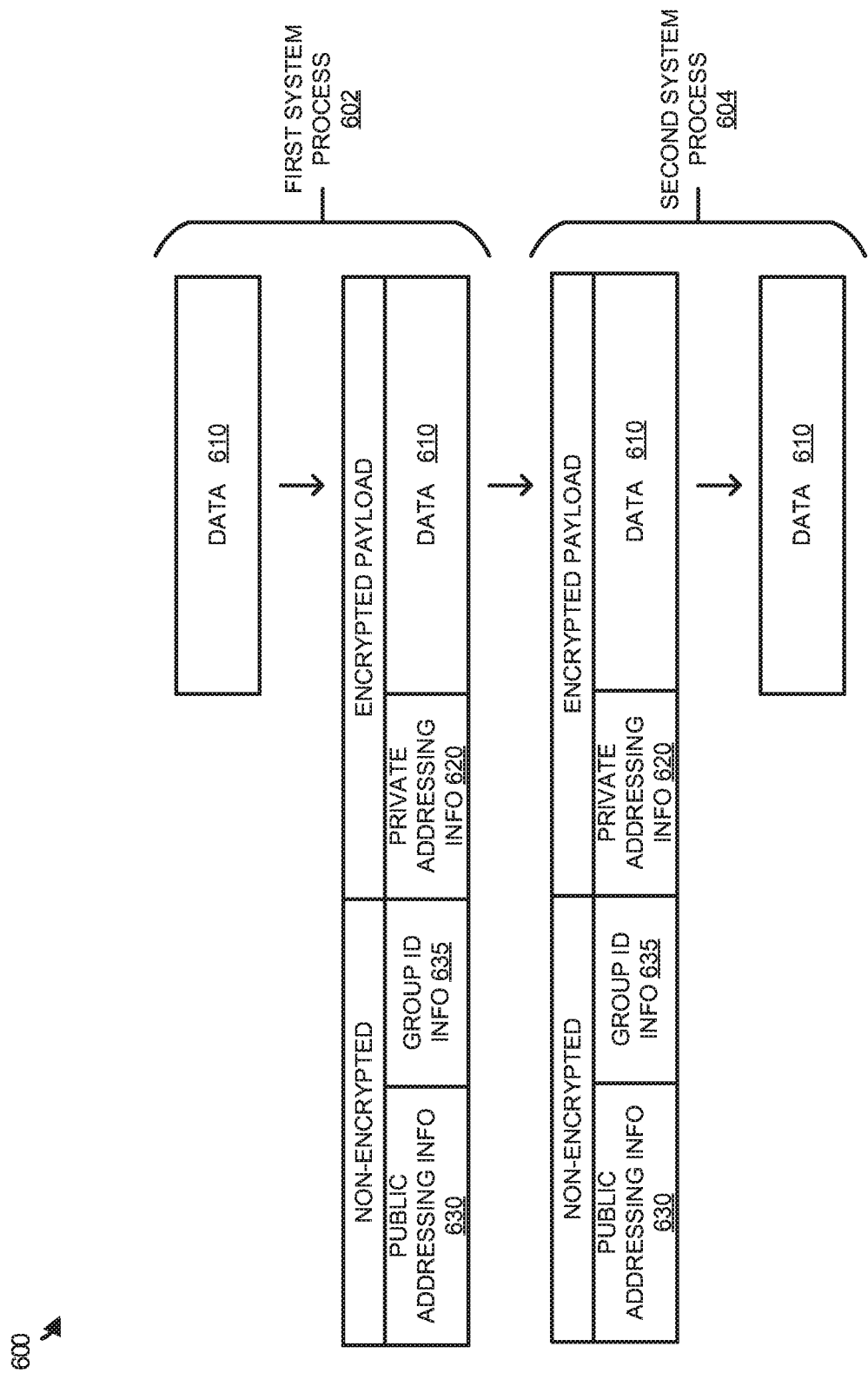
FIG. 6 illustrates an overview of a secure packet interaction between computing systems according to an implementation.

FIG. 6 illustrates an overview 600 of a secure packet interaction between computing systems according to an implementation. Overview 600 includes first system process 602 that is representative of operations that may be provided on a first computing system, such as computing system 105, and second system process 604 that is representative of operations that may be provided on a receiving computing system, such as computing system 130. Overview 600 further includes data 610, private addressing information 620, group identifier (ID) information 635, and public addressing information 630. Although demonstrated in the example below as a packet that is transferred between computing systems, it should be understood that similar operations may be provided when an application requires a DNS lookup request.

Referring to first system process 602, when an application requires a communication, the application may provide data 610, which is identified by a communication service executing on the computing system. In particular, the application may be allocated to a communication group, wherein the communication group may communicate via an overlay addressing scheme with other applications and computing systems allocated to the communication group. For example, in an organization, finance applications may be configured such that they can communicate with one or more computing systems that also belong to the finance group.

Once a communication request is received with the application data, the communication service may process the request to generate a data packet to support the communication request. In some examples, the application may provide private addressing information associated with the private network or overlay network associated with the application. Based on the private addressing information, the communication service may determine if the communication is permitted and generate the packet with private addressing information 620 (provided at least in part from the application), group ID information 635 and public addressing information 630. Private addressing information 620 may include private source and destination IP addresses, private source and destination ports, a communication protocol, or some other similar information for the data packet. Group identifier information 635 may include various information that can be used in verifying and decrypting the packet. In some examples, this information may include a group identifier associated with the communication group for the application, a service version identifier associated with the communication service, as well as other attributes associated with the encrypted portion of packet. Public addressing information 630, which is also included in the non-encrypted portion of the packet is also used in routing the communication between computing systems. In particular, the public addressing information may include source and destination IP addresses associated with an underlay network connection for the computing systems (e.g. the addresses allocated to physical interfaces of the computing systems), the ports that the services communicate over, and a protocol for the communication. These addresses and ports are different than the private addresses that are used by the applications on the computing system.

Once the packet is generated and transferred to the receiving computing system, the receiving computing system will perform second system process 604. In particular, the second computing system will process the packet to extract the data from the packet. To provide this operation, the communication service on the second computing system will inspect group identifier information 635 to determine how to decrypt the packet, and extract data 610 from the packet. In some implementations, to provide this decryption operation, the service may identify traits within the group identifier information, such as the group identifier, the service type, and the length of the packet. The decrypted data may then be provided to the required application.

Although described in the previous example as a communication between computing systems of the same communication group, it should be understood that similar operations may be applied when a computing system requires a communication with the private DNS. In particular, rather than including application data, information may be included for the DNS lookup request, such as the request URL or URI within the packet. Additionally, the private addressing and the public addressing may be used to route the communications to the particular private DNS, and the group identifier information may be used to ensure that the requesting computing system is of the same communication group as the private DNS. In some examples, the private DNS may further generate at least one secure packet of its own to provide the requested private address to support the DNS lookup request.

Figure 7:
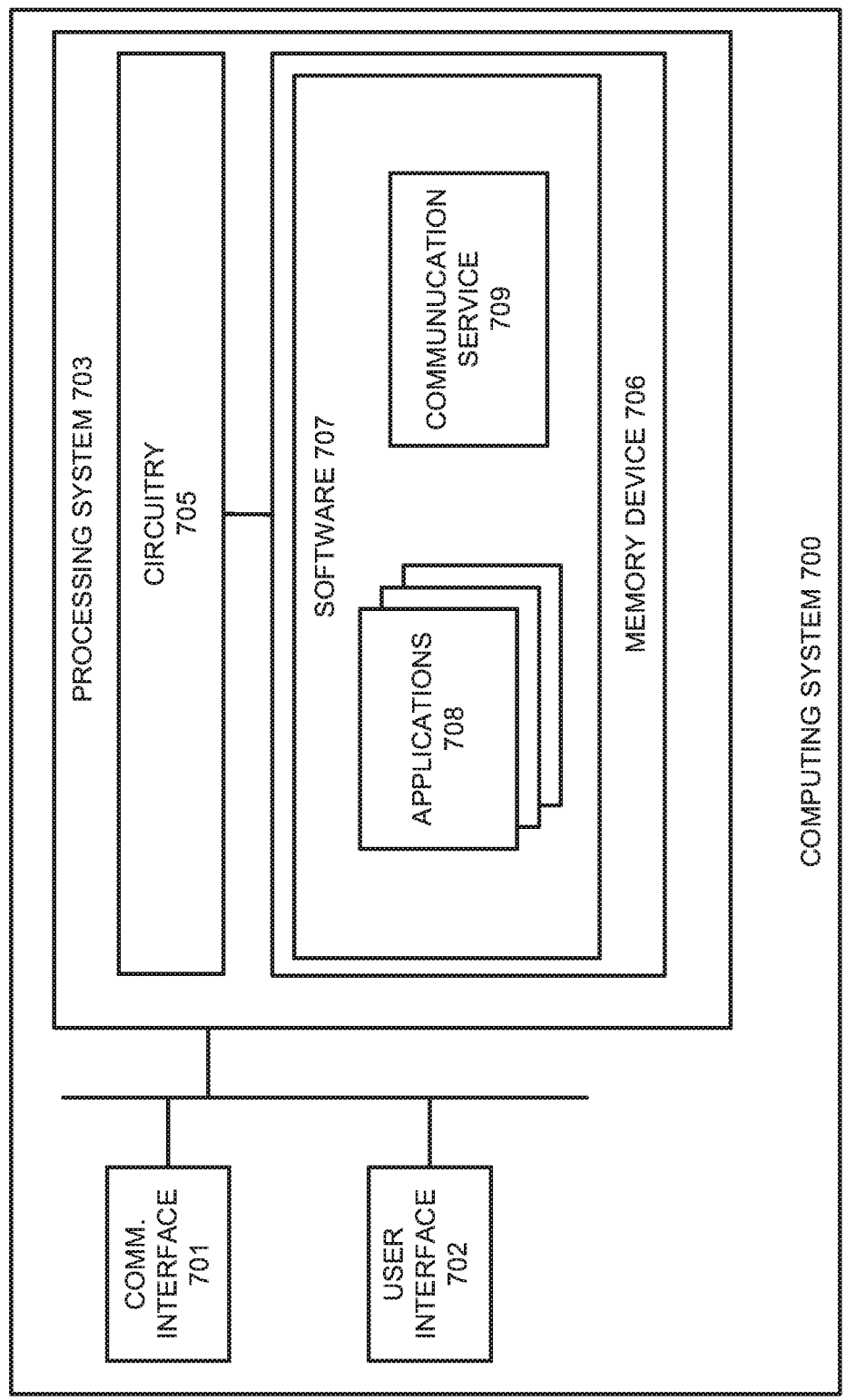
FIG. 7 illustrates a computing system capable of secure packet interactions according to an implementation.

FIG. 7 a computing system 700 capable of secure interactions according to an implementation. Computing system 700 is representative of any computing system or systems with which the various operational architectures, processes, scenarios, and sequences disclosed herein for a computing system with a communication service can be implemented. Computing system 700 is an example of computing systems 105 and 130-132, although other examples may exist. Computing system 700 comprises communication interface 701, user interface 702, and processing system 703. Processing system 703 is linked to communication interface 701 and user interface 702. Processing system 703 includes processing circuitry 705 and memory device 706 that stores operating software 707. Computing system 700 may include other well-known components such as a battery and enclosure that are not shown for clarity.

Communication interface 701 comprises components that communicate over communication links, such as network cards, ports, radio frequency (RF), processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof. In at least one implementation, communication interface 701 may be used to communicate with other end computing systems and a private DNS as described herein.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises microprocessor and other circuitry that retrieves and executes operating software 707 from memory device 706. Memory device 706 may include volatile and nonvolatile, removable and non-removable media implemented in any method or technology for storage of information, such as computer readable instructions stored on a non-transitory computer-readable storage medium, data structures, program modules, or other data. Memory device 706 may be implemented as a single storage device, but may also be implemented across multiple storage devices or sub-systems. Memory device 706 may comprise additional elements, such as a controller to read operating software 707. Examples of storage media include random access memory, read only memory, magnetic disks, optical disks, and flash memory, as well as any combination or variation thereof, or any other type of storage media. In all the implementations envisaged by the present disclosure, the storage media is a non-transitory storage media. It should be understood that in no case is the storage media a propagated signal.

Processing circuitry 705 is typically mounted on a circuit board that may also hold memory device 706 and portions of communication interface 701 and user interface 702. Operating software 707 comprises computer programs, firmware, or some other form of machine-readable program instructions. Operating software 707 includes applications 708 and communication service 709, although any number of software modules may provide a similar operation. Operating software 707 may further include an operating system, utilities, drivers, network interfaces, applications, or some other type of software. When executed by processing circuitry 705, operating software 707 directs processing system 703 to operate computing system 700 as described herein.

In at least one implementation, applications 708, when read and executed by processing system 703, direct processing system 703 to provide various operations on computing system 700. These operations include front-end applications, data processing applications, productivity applications, gaming applications and the like. During the execution of the applications, the applications may require communications with one or more applications executing on separate computing systems. To support the communications, communication service 709 is provided, wherein communication service 709 directs processing system 703 to identify the communication requests, and generate secure packets as described herein to support the communication requests.

In the present implementation, in supporting the communications, communication service 709 may provide DNS lookup requests to a private DNS associated with a communication group for computing system 700. This communication group permits computing systems allocated permissions for the communication group to communicate data using a private overlay network. As an example, when a communication request is identified from an application with a DNS lookup requirement, communication service 709 may generate a DNS lookup request to be transferred to the private DNS associated with the private communication group. In some implementations, the private DNS may reside on the same private overlay network as part of the communication group. In this implementation, packets transferred to the private DNS may be secured in a similar manner to the data packets that are transferred between computing systems. In particular, the packets may include an encrypted portion used in specifying the DNS lookup request (e.g. the URL, URI, and the like for the request) and private addressing information associated with the overlay network, and a non-encrypted portion that includes the public underlay addressing for the computing systems and group identifier information, wherein the group identifier information may be used by the destination computing system in decrypting the packet.

Once the DNS lookup request is provided to the private DNS associated with the communication group, communication service 709 may receive a DNS lookup response from the private DNS that specifies a private network address to communicate with the desired computing system. This private destination network address may then be used by computing system 700 in generating packets to communicate with the desired computing system.

Figure 8:
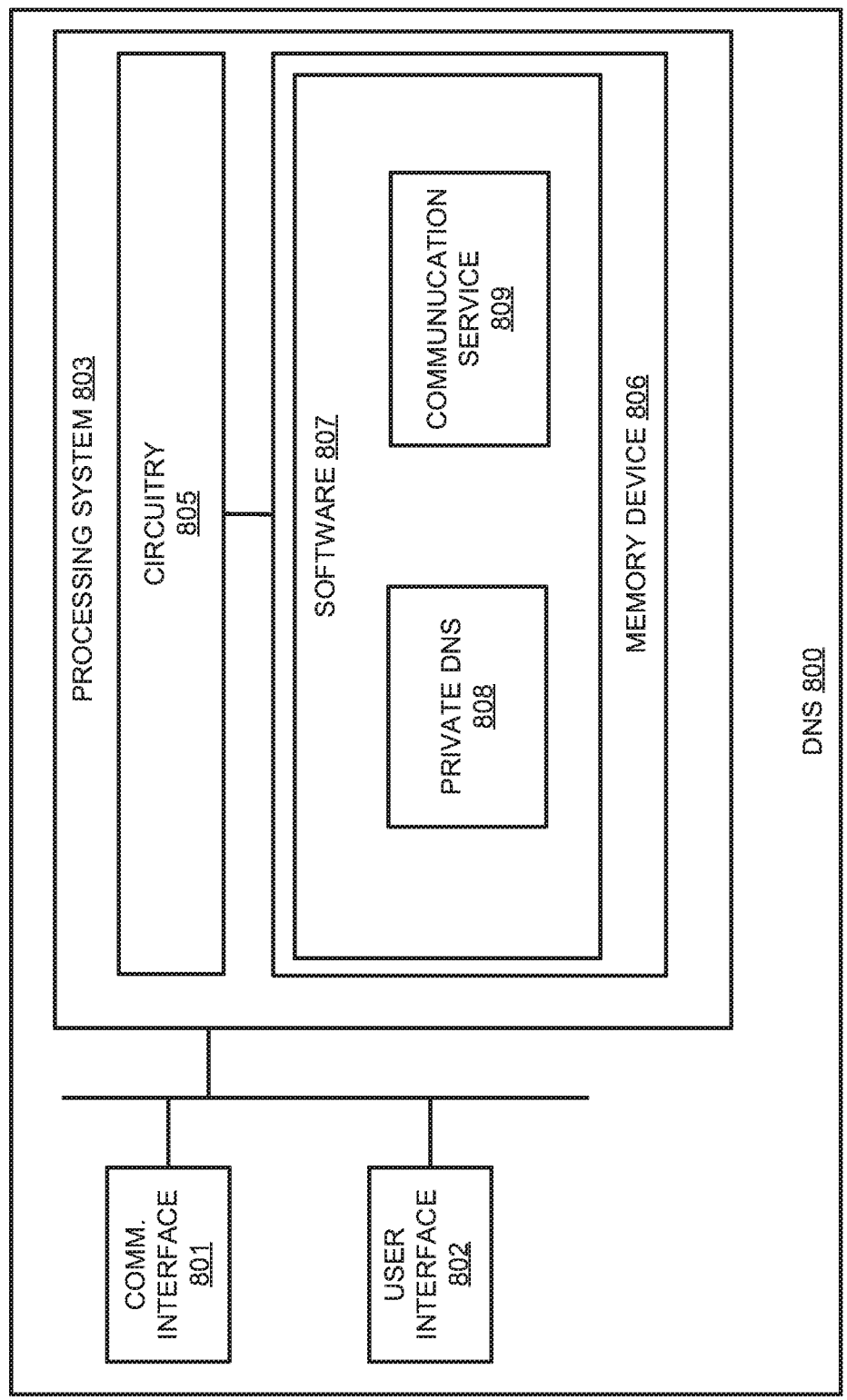
FIG. 8 illustrates a DNS capable of managing secure addressing information according to an implementation.

FIG. 8 illustrates a DNS 800 capable of managing secure addressing information according to an implementation. DNS 800 is representative of any computing system or systems with which the various operational architectures, processes, scenarios, and sequences disclosed herein for a private DNS may be implemented. DNS 800 is an example of DNS 110, although other examples may exist. DNS 800 comprises communication interface 801, user interface 802, and processing system 803. Processing system 803 is linked to communication interface 801 and user interface 802. Processing system 803 includes processing circuitry 805 and memory device 806 that stores operating software 807. DNS 800 may include other well-known components such as a battery and enclosure that are not shown for clarity.

Communication interface 801 comprises components that communicate over communication links, such as network cards, ports, radio frequency (RF), processing circuitry and software, or some other communication devices. Communication interface 801 may be configured to communicate over metallic, wireless, or optical links. Communication interface 801 may be configured to use Time Division Multiplex (TDM), Internet Protocol (IP), Ethernet, optical networking, wireless protocols, communication signaling, or some other communication format—including combinations thereof. In at least one implementation, communication interface 801 may be used to communicate with other end computing systems that operate in the same private communication group.

User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus—including combinations thereof. User interface 802 may be omitted in some examples.

Processing circuitry 805 comprises microprocessor and other circuitry that retrieves and executes operating software 807 from memory device 806. Memory device 806 may include volatile and nonvolatile, removable and non-removable media implemented in any method or technology for storage of information, such as computer readable instructions stored on a non-transitory computer-readable storage medium, data structures, program modules, or other data. Memory device 806 may be implemented as a single storage device, but may also be implemented across multiple storage devices or sub-systems. Memory device 806 may comprise additional elements, such as a controller to read operating software 807. Examples of storage media include random access memory, read only memory, magnetic disks, optical disks, and flash memory, as well as any combination or variation thereof, or any other type of storage media. In all the implementations envisaged by the present disclosure, the storage media is a non-transitory storage media. It should be understood that in no case is the storage media a propagated signal.

Processing circuitry 805 is typically mounted on a circuit board that may also hold memory device 806 and portions of communication interface 801 and user interface 802. Operating software 807 comprises computer programs, firmware, or some other form of machine-readable program instructions. Operating software 807 includes private DNS 808 and communication service 809, although any number of software modules may provide a similar operation. Operating software 807 may further include an operating system, utilities, drivers, network interfaces, applications, or some other type of software. When executed by processing circuitry 805, operating software 807 directs processing system 803 to operate DNS 800 as described herein.

In one implementation, private DNS 808 is used to provide DNS services to computing systems with applications that are part of a private overlay network. In particular, when an application requires a DNS lookup, a communication service executing on the computing system may identify the requirement, and transfer the DNS lookup request to DNS 800. In response to the request, private DNS 808 may forward the lookup request to public DNS to obtain a public destination network address associated with the lookup request. Once obtained, private DNS 808 will translate the public destination address to a private destination address. The private destination address is then transferred back to the requesting computing system for use in providing the required communication for the application on the computing system.

In the present example, in addition to private DNS 808, processing system 803 further executes communication service 809 that is used to provide communication interactions with computing systems that are part of the communication group associated with private DNS 808. In some examples, communication service 809 may be responsible for identifying secure packets provided from the computing systems, wherein the packets include encrypted and non-encrypted portions as further described herein in FIGS. 1-7. Additionally, communication service 809 may be configured to provide the DNS lookup response using a secure packet associated with the communication group, wherein the generated response packet may include the encrypted and non-encrypted portions as described in FIGS. 1-7.

Returning to the elements of FIG. 1, computing systems 105 and 130-132, and DNSs 110 and 112 may each comprise communication interfaces, network interfaces, processing systems, computer systems, microprocessors, storage systems, storage media, or some other processing devices or software systems, and can be distributed among multiple devices. Computing systems 105 and 130-132, and DNSs 110 and 112 can each include software such as an operating system, logs, databases, utilities, drivers, natural language processing software, networking software, and other software stored on a non-transitory computer-readable storage medium. Computing systems 105 and 130-132, and DNSs 110 and 112 may each comprise a serving computing system, a desktop computing system, or some other similar computing system. In some implementations, computing systems 105 and 130-132, and DNSs 110 and 112 may comprise virtual nodes, such as virtual machines.

Communication network 120 comprises network elements that provide communication services to computing system. Communication network 120 may comprise real and virtual switches, wireless access nodes, Internet routers, network gateways, application servers, computer systems, communication links, or some other type of communication equipment—including combinations thereof.

Communication between computing systems 105 and 130-132, and DNSs 110 and 112 may use metal, glass, optical, air, space, or some other material as the transport media. Communication between computing systems 105 and 130-132, and DNSs 110 and 112 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between computing systems 105 and 130-132, and DNSs 110 and 112 may be a direct link or can include intermediate networks, systems, or devices, and can include a logical network link transported over multiple physical links.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A computer-implemented system for enhancing security of domain name system (DNS) interactions occurring in a communication network comprising at least a first computing system and a second computing system, said system comprising:
    a processor;
    a memory module communicably coupled to said processor, said memory module storing computer program code, wherein said memory module and said computer program code stored therein are configured, with the processor, to:
        establish an overlay network communicably coupling said first computing system and said second computing system;
        establish a private domain name system (DNS) accessible only to said first computing system and said second computing system, only through said overlay network;
        in response to receiving, from said first computing system, a request for communicating with said second computing system, generate a first secured data packet comprising an encrypted portion and a non-encrypted portion, and wherein said encrypted portion of said first secured data packet incorporates at least a uniform resource locator (URL) corresponding to said second computing system, a private source address corresponding to said first computing system, and a private destination address corresponding to said private DNS;
        transmit said first secured data packet to said private DNS over said overlay network, instead of a TCP/IP network protocol stack embedded within said first computing system;
        trigger said private DNS to process said first secured data packet and consult a predetermined public DNS to retrieve therefrom at least a public destination address corresponding to said second computing system;
        trigger said private DNS to selectively translate said public destination address corresponding to said second computing system, into a private destination address corresponding to said second computing system;
        in an event said public destination address corresponding to said second computing system is not translated into said private destination address corresponding to said second computing system, trigger said private DNS to selectively enable said first computing system to communicate with said second computing system using said public destination address, based on a pre-configured policy applicable to said private DNS;
        in an event said public destination address corresponding to said second computing system is translated into said private destination address corresponding to said second computing system, trigger said private DNS to encapsulate said private destination address corresponding to said second computing system within an encrypted portion of a second secured data packet; and
        trigger said private DNS to transmit said second secured data packet to said first computing system via said overlay network, and trigger said first computing system to establish communication with said second computing device, based on said private addressing information corresponding to said second computing system, embedded within said encrypted portion of said second secured data packet.

2. The system as claimed in claim 1, wherein said non-encrypted portion of said first secured data packet incorporates a public source address corresponding to said first computing system, a public destination address corresponding to said private DNS, and supplementary information necessary for decrypting said encrypted portion of said first secured data packet.

3. The system as claimed in claim 1, wherein said supplementary information necessary for decrypting said encrypted portion of said first secured data packet is selected from the group of information consisting of a group identifier, length of said encrypted portion, sequence number of said first secured data packet, a predetermined keyed-hash message authentication code (HMAC), a peer identifier, and a predetermined initialization vector.

4. The system as claimed in claim 1, wherein said encrypted portion of said second secured data packet further incorporates a private source address corresponding to said private DNS, and a private destination address corresponding to said second computing system.

5. The system as claimed in claim 1, wherein a non-encrypted portion of said second secured data packet incorporates a public source address corresponding to said second computing system, a public destination address corresponding to said private DNS, and supplementary information necessary for decrypting said encrypted portion of said second secured data packet.

6. The system as claimed in claim 1, wherein said first computing system is configured to decrypt said encrypted portion of said second secured data packet and retrieve said private destination address corresponding to said second computing system therefrom.

7. The system as claimed in claim 1, wherein said private DNS is further configured to transmit to said first computing system, said second secured data packet embodying said private destination address, as a DNS lookup response, said private DNS further configured to selectively transmit to said first computing system, said public destination address corresponding to said second computing system as said DNS lookup response, in an event said private destination address corresponding to said public destination address is deemed unavailable.

8. The system as claimed in claim 1, wherein said private DNS is further configured to selectively block said request for communicating with said second computing system, based on said pre-configured policy applicable to said private DNS, in an event said public destination address corresponding to said second computing system is not translated into said private destination address corresponding to said second computing system.

9. A computer-implemented method for enhancing security of domain name system (DNS) interactions in a communication network comprising at least a first computing system and a second computing system, said method comprising the following computer-implemented steps:
  establishing, by a processor, an overlay network communicably coupling said first computing system and said second computing system;
  establishing, by said processor, a private domain name system (DNS) accessible only to said first computing system and said second computing system, only through said overlay network;
  generating, by said processor, a first secured data packet comprising an encrypted portion and a non-encrypted portion, in response to receiving, from said first computing system, a request for communicating with said second computing system;
  embedding, by said processor, at least a uniform resource locator (URL) corresponding to said second computing system, a private source address corresponding to said first computing system, and a private destination address corresponding to said private DNS, into said encrypted portion of said first secured data packet;
  transmitting, by said processor, said first secured data packet to said private DNS over said overlay network, instead of a TCP/IP network protocol stack embedded within said first computing system;
  processing, by said private DNS, said first secured data packet and consulting, by said private DNS, a predetermined public DNS to retrieve therefrom at least a public destination address corresponding to said second computing system;
  selectively translating, by said private DNS, said public destination address corresponding to said second computing system, into a private destination address corresponding to said second computing system;
  in an event said public destination address corresponding to said second computing system is not translated into said private destination address corresponding to said second computing system, selectively enabling said first computing system to communicate with said second computing system using said public destination address, based on a pre-configured policy applicable to said private DNS;
  in an event said public destination address corresponding to said second computing system is translated into said private destination address corresponding to said second computing system, encapsulating, by said private DNS, said private destination address corresponding to said second computing system within an encrypted portion of a second secured data packet; and
  transmitting, by said private DNS, said second secured data packet to said first computing system via said overlay network, and triggering, by said private DNS, said first computing system to establish communication with said second computing device, based on said private addressing information corresponding to said second computing system, embedded within said encrypted portion of said second secured data packet.

10. The method as claimed in claim 9, wherein the method further includes the step of embedding, by said processor, a public source address corresponding to said first computing system, a public destination address corresponding to said private DNS, and supplementary information necessary for decrypting said encrypted portion of said first secured data packet at said private DNS, into said non-encrypted portion of said first secured data packet.

11. The method as claimed in claim 10, wherein the method further includes the step of decrypting, by said private DNS, said encrypted portion of said first secured data packet, based on said supplementary information, and wherein said supplementary information is selected form the group of information consisting of a group identifier, length of said encrypted portion, sequence number of said first secured data packet, a predetermined keyed-hash message authentication code (HMAC), a peer identifier, and a predetermined initialization vector.

12. The method as claimed in claim 9, wherein the step of consulting, by said private DNS, a predetermined public DNS, further includes the step of retrieving, by said private DNS, a public destination address corresponding to said second computing system, from said public DNS, based on said URL embedded within said encrypted portion of said first secured data packet.

13. The method as claimed in claim 9, wherein the method further includes the step of embedding, by said private DNS, a private source address corresponding to said private DNS, and a private destination address corresponding to said second computing system, into said encrypted portion of said second secured data packet.

14. The method as claimed in claim 9, wherein the method further includes the step of embedding, by said private DNS, a public source address corresponding to said second computing system, a public destination address corresponding to said private DNS, and supplementary information necessary for decrypting said encrypted portion of said second secured data packet, into a non-encrypted portion of said second secured data packet.

15. The method as claimed in claim 9, wherein the step of transmitting, by said private DNS, said second secured data packet to said first computing system via said overlay network, further includes the step of triggering, by said private DNS, said first computing system to decrypt said encrypted portion of said second secured data packet and retrieve said private destination address corresponding to said second computing system therefrom.

16. The method as claimed in claim 9, wherein the step of transmitting, by said private DNS, said second secured data packet to said first computing system via said overlay network, further includes the following steps:
   transmitting, by said private DNS, said second secured data packet embodying said private destination address corresponding to said second computing system, as a DNS lookup response;
   transmitting, by said private DNS, said public destination address corresponding to said second computing system as said DNS lookup response, in an event said private destination address corresponding to said public destination address is deemed unavailable.

17. The method as claimed in claim 9, wherein the method further includes the step of triggering said private DNS to selectively block said request for communicating with said second computing system, based on said pre-configured policy applicable to said private DNS, in an event said public destination address corresponding to said second computing system is not translated into said private destination address corresponding to said second computing system.

18. A non-transitory computer-readable storage medium having computer-executable instructions stored thereon, said computer executable instructions, when executed by a processor, cause said processor to:
   establish an overlay network communicably coupling said first computing system and said second computing system;
   establish a private domain name system (DNS) accessible only to said first computing system and said second computing system, only through said overlay network;
   in response to receiving, from said first computing system, a request for communicating with said second computing system, generate a first secured data packet comprising an encrypted portion and a non-encrypted portion, and wherein said encrypted portion of said first secured data packet incorporates at least a uniform resource locator (URL) corresponding to said second computing system, a private source address corresponding to said first computing system, and a private destination address corresponding to said private DNS;
   transmit said first secured data packet to said private DNS over said overlay network, instead of a TCP/IP network protocol stack embedded within said first computing system;
   trigger said private DNS to process said first secured data packet and consult a predetermined public DNS to retrieve therefrom at least a public destination address corresponding to said second computing system;
   trigger said private DNS to selectively translate said public destination address corresponding to said second computing system, into a private destination address corresponding to said second computing system;
   in an event said public destination address corresponding to said second computing system is not translated into said private destination address corresponding to said second computing system, trigger said private DNS to selectively enable said first computing system to communicate with said second computing system using said public destination address, based on a pre-configured policy applicable to said private DNS;
   in an event said public destination address corresponding to said second computing system is translated into said private destination address corresponding to said second computing system, trigger said private DNS to encapsulate said private destination address corresponding to said second computing system within an encrypted portion of a second secured data packet; and
   trigger said private DNS to transmit said second secured data packet to said first computing system via said overlay network, and trigger said first computing system to establish communication with said second computing device, based on said private addressing information corresponding to said second computing system, embedded within said encrypted portion of said second secured data packet.

19. The computer-executable instructions as claimed in claim 18, wherein said computer-executable instructions, when executed by said processor, further cause said processor to:
   embed a public source address corresponding to said first computing system, a public destination address corresponding to said private DNS, and supplementary information necessary for decrypting said encrypted portion of said first secured data packet, into said non-encrypted portion of said first secured data packet;
   embed a private source address corresponding to said private DNS, and a private destination address corresponding to said second computing system, into said encrypted portion of said second secured data packet;
   embed a public source address corresponding to said second computing system, a public destination address corresponding to said private DNS, and supplementary information necessary for decrypting said encrypted portion of said second secured data packet, into a non-encrypted portion of said second secured data packet;
   trigger said first computing system to decrypt said encrypted portion of said second secured data packet and retrieve said private destination address corresponding to said second computing system therefrom;
   trigger said private DNS to transmit to said first computing system, said second secured data packet embodying said private destination address, as a DNS lookup response;
   selectively trigger said private DNS to transmit to said first computing system, said public destination address corresponding to said second computing system as said DNS lookup response, in an event said private destination address corresponding to said public destination address is deemed unavailable; and
   selectively trigger said private DNS to block said request for communicating with said second computing system, based on said pre-configured policy applicable to said private DNS, in an event said public destination address corresponding to said second computing system is not translated into said private destination address corresponding to said second computing system.

* * * * *